(12) United States Patent
Fukagawa

(10) Patent No.: US 10,400,133 B2
(45) Date of Patent: Sep. 3, 2019

(54) CURABLE COMPOSITION, CONDUCTIVE COATED FILM, AND ANTISTATIC COATED FILM

(71) Applicant: FUJIFILM Corporation, Tokyo (JP)

(72) Inventor: Kiyotaka Fukagawa, Kanagawa (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 0 days.

(21) Appl. No.: 15/835,739

(22) Filed: Dec. 8, 2017

(65) Prior Publication Data

US 2018/0100084 A1    Apr. 12, 2018

Related U.S. Application Data

(63) Continuation of application No. PCT/JP2016/070422, filed on Jul. 11, 2016.

(30) Foreign Application Priority Data

Jul. 14, 2015 (JP) .................................. 2015-140402
Jul. 6, 2016 (JP) .................................. 2016-134151

(51) Int. Cl.
| | |
|---|---|
| C09D 135/00 | (2006.01) |
| C08F 222/38 | (2006.01) |
| C09D 125/18 | (2006.01) |
| C09D 165/00 | (2006.01) |
| C09D 5/24 | (2006.01) |
| C09K 3/16 | (2006.01) |
| H01B 1/12 | (2006.01) |
| C08F 22/38 | (2006.01) |
| C08F 291/00 | (2006.01) |
| C08G 61/12 | (2006.01) |
| C09D 133/26 | (2006.01) |
| C08L 25/18 | (2006.01) |
| C09D 4/06 | (2006.01) |
| C09D 133/24 | (2006.01) |
| C09D 4/00 | (2006.01) |

(52) U.S. Cl.
CPC .......... *C09D 135/00* (2013.01); *C08F 22/38* (2013.01); *C08F 222/385* (2013.01); *C08F 291/00* (2013.01); *C08G 61/126* (2013.01); *C08L 25/18* (2013.01); *C09D 4/00* (2013.01); *C09D 4/06* (2013.01); *C09D 5/24* (2013.01); *C09D 125/18* (2013.01); *C09D 133/24* (2013.01); *C09D 133/26* (2013.01); *C09D 165/00* (2013.01); *C09K 3/16* (2013.01); *H01B 1/125* (2013.01); *C08G 2261/1424* (2013.01); *C08G 2261/18* (2013.01); *C08G 2261/3223* (2013.01); *C08G 2261/51* (2013.01)

(58) Field of Classification Search
None
See application file for complete search history.

(56) References Cited

U.S. PATENT DOCUMENTS

2012/0205043 A1* 8/2012 Kurimura ................. C08F 2/50
                                                                156/275.5
2014/0132685 A1* 5/2014 Amao ..................... C09D 11/00
                                                                347/102

FOREIGN PATENT DOCUMENTS

| JP | 03250013 A | 11/1991 |
|---|---|---|
| JP | 2007-031372 A | 2/2007 |
| JP | 2008-133322 A | 6/2008 |
| JP | 2014-069512 A | 4/2014 |
| JP | 2014-118442 A | 6/2014 |
| JP | 2014-198775 A | 10/2014 |
| JP | 2015-025076 A | 2/2015 |
| JP | 2016169253 A | 9/2016 |

OTHER PUBLICATIONS

English text machine translation of Yasushi et al. (JP 2007-031372 A), accessed from the Espacenet website; pp. 1-34. (Year: 2007).*
English text machine translation of Kazuyoshi et al. (JP 2008-133322 A), accessed from the Espacenet website; pp. 1-23. (Year: 2008).*
Communication dated Oct. 2, 2018, issued by the Japan Patent Office in corresponding Japanese Application No. 2017-528673.
International Search Report dated Aug. 30, 2016, in counterpart International Application No. PCT/JP2016/070422.
Written Opinion of the International Searching Authority dated Aug. 30, 2016, in counterpart International Application No. PCT/JP2016/070422.

(Continued)

*Primary Examiner* — Katie L. Hammer
(74) *Attorney, Agent, or Firm* — Sughrue Mion, PLLC

(57) ABSTRACT

An object of the present invention is to provide a curable composition from which a conductive coated film and an antistatic coated film with excellent toughness are obtained; and a conductive coated film and an antistatic coated film formed by curing the curable composition. The curable composition of the present invention contains at least one polyfunctional (meth)acrylamide compound selected from the group consisting of a polyfunctional (meth)acrylamide compound represented by Formula (I) and a polyfunctional (meth)acrylamide compound represented by Formula (II); a π-conjugated conductive polymer; and water.

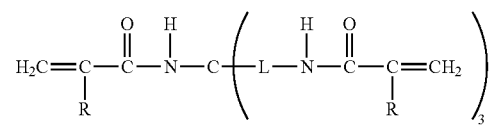

Formula (I)

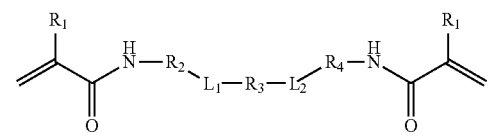

Formula (II)

3 Claims, No Drawings

(56) References Cited

OTHER PUBLICATIONS

International Preliminary Report on Patentability dated Jan. 16, 2018, in counterpart International Application No. PCT/JP2016/070422.
Communication dated Jul. 10, 2018, from the European Patent Office in counterpart European Application No. 16824436.6.

* cited by examiner

US 10,400,133 B2

CURABLE COMPOSITION, CONDUCTIVE COATED FILM, AND ANTISTATIC COATED FILM

CROSS-REFERENCE TO RELATED APPLICATIONS

This application is a Continuation of PCT International Application No. PCT/JP2016/070422 filed on Jul. 11, 2016, which claims priority under 35 U.S.C. § 119(a) to Japanese Patent Application No. 2015-140402 filed on Jul. 14, 2015 and Japanese Patent Application No. 2016-134151 filed on Jul. 6, 2016. Each of the above applications is hereby expressly incorporated by reference, in its entirety, into the present application.

BACKGROUND OF THE INVENTION

1. Field of the Invention

The present invention relates to a curable composition, a conductive coated film, and an antistatic coated film.

2. Description of the Related Art

Since a conductive coated film and an antistatic coated film formed of a π-conjugated conductive polymer such as PEDOT/PSS (poly(3,4-ethylenedioxythiophene) formed by being doped with poly(styrenesulfonic acid)) are lightweight and can be folded, applications of these films to display devices, electronic elements, and the like are expected.

For example, JP2007-31372A discloses a conductive polymer coating material (claim 3) which contains a polyfunctional acrylamide monomer and a π-conjugated conductive polymer; and a conductive coated film (claim 4) which is formed by being coated with a conductive polymer coating material. Further, it is described that the conductive coated film can be suitably used for an antistatic film (paragraph [0070]).

SUMMARY OF THE INVENTION

Meanwhile, a conductive polymer coating material (curable composition) has been prepared by mixing ditrimethylolpropane tetraacrylamide and a PEDOT/PSS aqueous solution by the present inventors with reference to examples in JP2007-31372A. As the result, it was found that the obtained conductive coated film and the antistatic coated film (hereinafter, also collectively and simply referred to as a "conductive coated film") are occasionally broken at the time of being folded repeatedly. That is, it was found that the obtained conductive coated film does not necessarily satisfy the level of toughness which has been required recently.

An object of the present invention is to provide a curable composition from which a conductive coated film and an antistatic coated film with excellent toughness are obtained; and a conductive coated film and an antistatic coated film formed by curing the curable composition.

The above-described problems have been intensively examined by the present inventors. As the result, it was found that the above-described problems can be solved by using a specific polyfunctional (meth)acrylamide compound, thereby completing the present invention.

(1) A curable composition comprising: at least one polyfunctional (meth)acrylamide compound selected from the group consisting of a polyfunctional (meth)acrylamide compound represented by Formula (I) described below and a polyfunctional (meth)acrylamide compound represented by Formula (II) described below; a π-conjugated conductive polymer; and water.

(2) The curable composition according to (1), further comprising: a compound represented by Formula (IV) described below.

(3) The curable composition according to (2), in which the content of the polyfunctional (meth)acrylamide compound is in a range of 5.0% to 87.5% by mass with respect to the total solid content, and the content of the compound represented by Formula (IV) is 0.5% by mass or greater and less than 10% by mass with respect to the total solid content.

(4) A conductive coated film which is formed by curing the curable composition according to any one of (1) to (3).

(5) An antistatic coated film which is formed by curing the curable composition according to any one of (1) to (3).

According to the present invention, it is possible to provide a curable composition from which a conductive coated film and an antistatic coated film with excellent toughness are obtained; and a conductive coated film and an antistatic coated film formed by curing the curable composition, as described below.

DESCRIPTION OF THE PREFERRED EMBODIMENTS

Hereinafter, preferred embodiments for carrying out the present invention will be described.

In the present specification, the concept of "(meth)acrylamide" includes any or both of acrylamide and methacrylamide, and the same applies to the terms "(meth)acryl" and "(meth)acrylate". Further, the numerical ranges shown using "to" indicate ranges including the numerical values described before and after "to" as the lower limit values and the upper limit values.

In the present specification, in a case where a plurality of substituents, linking groups, or the like (hereinafter, referred to as substituents or the like) represented by specific symbols are present or a plurality of substituents or the like are defined at the same time, the respective substituents or the like may be the same as or different from each other. The same applies to the definition of the number of substituents or the like.

Further, in a case where groups (atomic groups) are noted without mentioning substitution and unsubstitution in the present specification, the concept thereof includes groups which do not have substituents and groups which have substituents. For example, the concept of an "alkyl group" includes not only an alkyl group (unsubstituted alkyl group) which does not have a substituent but also an alkyl group (substituted alkyl group) which has a substituent.

[Curable Composition]

A curable composition of the present invention (hereinafter, also referred to as a "composition of the present invention") includes at least one polyfunctional (meth)acrylamide compound selected from the group consisting of a polyfunctional (meth)acrylamide compound represented by Formula (I) described below and a polyfunctional (meth)acrylamide compound represented by Formula (II) described below; a π-conjugated conductive polymer; and water.

Since the composition of the present invention has such a configuration, a conductive coated film with excellent toughness is considered to be obtained. The reason thereof is not clear, but can be speculated as follows.

As described above, in a case where a composition is prepared by mixing ditrimethylolpropane tetraacrylamide and a PEDOT/PSS aqueous solution, the toughness of a conductive coated film to be obtained becomes insufficient. Based on the examination conducted by the present inventors, this phenomenon is known to be caused by low solubility of the ditrimethylolpropane tetraacrylamide in water and degradation in uniformity of the conductive coated film.

The present invention has been made in consideration of the above-described findings and is characterized by using a compound having a high solubility in water. That is, since a specific polyfunctional (meth)acrylamide compound described below has a high solubility in water, the uniformity of the conductive coated film to be obtained from the composition of the present invention is extremely high. As the result, it is considered that the concentration of stress at the time of folding the conductive coated film is small and thus breakage is unlikely to occur.

As described in the examples and the comparative examples described below, this can also be speculated from the fact that the compositions of Examples 1 to 12 in which a specific polyfunctional (meth)acrylamide compound was used had high uniformity and the toughness of the conductive coated films was excellent while the uniformity of the compositions of Comparative Examples 1 and 2 in which dimethylolpropane amide was used was low and the toughness of the conductive coated films was also low.

Hereinafter, each component contained in the composition of the present invention will be described in detail.

[Polyfunctional (Meth)Acrylamide Compound]

The composition of the present invention contains at least one polyfunctional (meth)acrylamide compound (hereinafter, also referred to as a "specific compound") selected from the group consisting of a polyfunctional (meth)acrylamide compound represented by Formula (I) and a polyfunctional (meth)acrylamide compound represented by Formula (II).

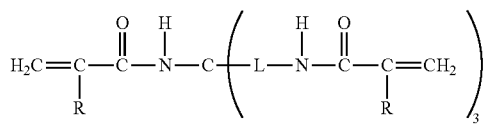

Formula (I)

In Formula (I), R represents a hydrogen atom or a methyl group. A plurality of R's may be the same as or different from each other.

L represents —O—, an alkylene group having 2 to 4 carbon atoms, or a divalent linking group formed by combining these. Further, it is preferable that carbon atoms are positioned at a position adjacent to a nitrogen atom in an amide group which is adjacent to L. That is, it is preferable that an alkylene group having 2 to 4 carbon atoms is positioned as the group adjacent to a nitrogen atom in an amide group.

Examples of the "divalent linking group formed by combining these" include an alkylene group having —O— and 2 to 4 carbon atoms such as —OCH$_2$CH$_2$—, —OCH$_2$CH$_2$CH$_2$—, —OCH$_2$CH$_2$CH$_2$CH$_2$—, —CH$_2$OCH$_2$—, —CH$_2$OCH$_2$CH$_2$—, or —CH$_2$OCH$_2$CH$_2$CH$_2$—; and a group represented by —(O-alkylene group (having 2 to 4 carbon atoms))$_n$- (n represents an integer of 2 or greater, the upper limit is not particularly limited and approximately 100 is exemplified as the upper limit).

Among these, from the viewpoint of excellent effects of the present invention, it is preferable that L represents an alkylene group having —O— and 2 to 4 carbon atoms.

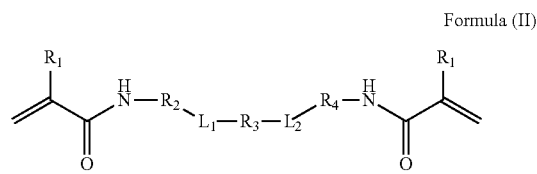

Formula (II)

In Formula (II), $R_1$ represents a hydrogen atom or a methyl group.

$R_2$ and $R_4$ each independently represent —O—, an alkylene group having 1 to 4 carbon atoms, or a divalent linking group formed by combining these. Further, it is preferable that carbon atoms are positioned at a position adjacent to a nitrogen atom in an amide group which is adjacent to $R_2$ and $R_4$. It is preferable that an alkylene group having 1 to 4 carbon atoms is positioned as the group adjacent to a nitrogen atom in an amide group.

Examples of the "divalent linking group formed by combining these" include an alkylene group having —O— and 1 to 4 carbon atoms such as —OCH$_2$—, —OCH$_2$CH$_2$—, —OCH$_2$CH$_2$CH$_2$—, —OCH$_2$CH$_2$CH$_2$CH$_2$—, —CH$_2$OCH$_2$—, —CH$_2$OCH$_2$CH$_2$—, or —CH$_2$OCH$_2$CH$_2$CH$_2$—; and a group represented by —(O-alkylene group (having 1 to 4 carbon atoms))$_n$- (n represents an integer of 2 or greater, the upper limit is not particularly limited and approximately 100 is exemplified as the upper limit). Further, in each group exemplified as the "divalent linking group formed by combining these", one of two binding sites may be bonded to the amide group.

Among these, from the viewpoint of excellent effects of the present invention, it is more preferable that $R_2$ and $R_4$ represent an alkylene group having 1 to 4 carbon atoms or an alkylene group having —O— and 1 to 4 carbon atoms.

In Formula (II), $R_3$ represents —O—, an alkylene group having 1 to 4 carbon atoms, a group represented by Formula (III), or a divalent linking group formed by combining these.

Examples of the "divalent linking group formed by combining these" include groups exemplified as $R_2$ and $R_4$ above. Further, in a case where a group represented by Formula (III) is combined with another group, it is preferable that an alkylene group having 1 to 4 carbon atoms is bonded to a nitrogen atom in the group represented by Formula (III).

Among these, from the viewpoint of excellent effects of the present invention, it is preferable that $R_3$ represents an alkylene group having 1 to 4 carbon atoms, an alkylene group having —O— and 1 to 4 carbon atoms, or a group represented by Formula (III).

$L_1$ and $L_2$ each independently represent a single bond or a group represented by Formula (III).

In a case where $R_3$ represents a group represented by Formula (III), it is preferable that both of $L_1$ and $L_2$ represent a single bond.

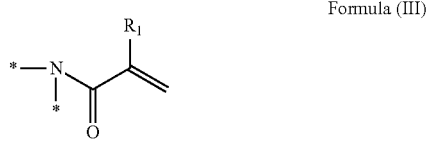

Formula (III)

In Formula (III), $R_1$ represents a hydrogen atom or a methyl group, and the symbol "*" represents a binding site. In addition, a carbon atom is typically positioned at the site of "*".

Specific examples of the polyfunctional (meth)acrylamide compound represented by Formula (I) or (II) will be described below.

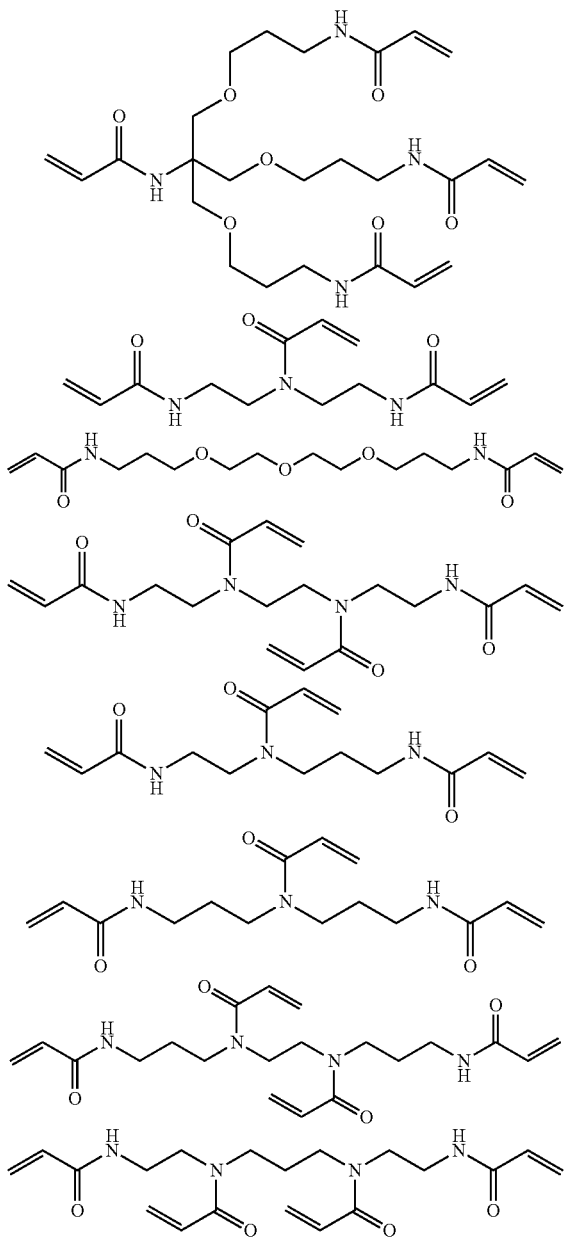

As the polyfunctional (meth)acrylamide compound represented by Formula (I) or (II), various commercially available products can be used or the polyfunctional (meth) acrylamide compound can be synthesized by a method described in JP2013-502654A.

The content of the specific compound in the composition of the present invention is not particularly limited, but is preferably in a range of 5.0% to 87.5% by mass and more preferably in a range of 40.0% to 87.0% by mass with respect to the total solid content.

In the present specification, the solid content indicates components constituting the conductive coated film and does not include a solvent. Since a monomer is a component constituting the conductive coated film, the solid content includes a monomer even in a case where the monomer is in the form of a liquid.

[π-Conjugated Conductive Polymer]

The π-conjugated conductive polymer is not particularly limited as long as the polymer is an organic polymer whose main chain has a π-conjugated system. Examples of such polymers include polypyrroles, polythiophenes, polyacetylenes, polyphenylenes, polyphenylenevinylenes, polyanilines, polyacenes, polythiophenevinylenes, and copolymers of these. From the viewpoints of ease of polymerization and stability in air, polypyrroles, polythiophenes, and polyanilines are preferable.

Sufficient conductivity and compatibility with a binder resin can be obtained even in a case where the π-conjugated conductive polymer remains unsubstituted. However, in order to further improve the conductivity and dispersibility or solubility in a binder resin, it is preferable that a functional group such as an alkyl group, a carboxy group, a sulfo group, an alkoxy group, a hydroxy group, or a cyano group is introduced to the π-conjugated conductive polymer.

Specific examples of such a π-conjugated conductive polymer include polypyrrole, poly(N-methylpyrrole), poly (3-methylpyrrole), poly(3-ethylpyrrole), poly(3-n-propylpyrrole), poly(3-butylpyrrole), poly(3-octylpyrrole), poly (3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), poly(3-methyl-4-hexyloxypyrrole), poly(thiophene), poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptylthiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-anilinesulfonic acid), and poly(3-anilinesulfonic acid).

Among these, polypyrrole, polythiophene, poly(N-methylpyrrole), poly(3-methylthiophene), poly(3-methoxythiophene), and poly(3,4-ethylenedioxythiophene) (PEDOT) are preferable.

Further, poly(3,4-ethylenedioxythiophene) obtained by being doped with poly(styrenesulfonic acid) (PEDOT/PSS) is water-soluble, which is preferable.

The π-conjugated conductive polymer may be used alone or in combination of two or more kinds thereof.

The π-conjugated conductive polymer can be produced by, for example, performing oxidative polymerization on a monomer.

The content of the π-conjugated conductive polymer in the composition of the present invention is not particularly limited, but is preferably in a range of 1% to 60% by mass and more preferably in a range of 5% to 30% by mass with respect to the total solid content. Here, in a case of a dopant such as poly(styrenesulfonic acid) (PSS) is present, the content indicates the total content of the π-conjugated conductive polymer and the dopant.

[Water]

The composition of the present invention contains water. It is preferable that the composition of the present invention is an aqueous solution.

The content of water in the composition of the present invention is not particularly limited, but is preferably in a range of 10% to 95% by mass and more preferably in a range of 50% to 90% by mass with respect to the total content of the composition.

[Other Monomers]

The composition of the present invention may contain monomers (for example, monofunctional monomers) other than the above-described specific compound.

Examples of the monofunctional monomers include hydroxy group-containing (meth)acrylate such as 2-hydroxyethyl (meth)acrylate, 2-hydroxypropyl (meth)acrylate, 2-hydroxybutyl (meth)acrylate, 4-hydroxybutyl (meth)acrylate, or glycerin mono(meth)acrylate; (meth)acrylic acid and a carboxylate thereof; nitrogen atom-containing (meth)acrylate such as dimethylaminoethyl (meth)acrylate or 2-morpholinoethyl (meth)acrylate; (meth)acrylate having an ether bond such as ethoxyethyl (meth)acrylate, 3-methoxybutyl (meth)acrylate, methoxydipropylene glycol (meth)acrylate, methoxytripropylene glycol (meth)acrylate, methoxypolyethylene glycol (meth)acrylate, or phenoxyethyl (meth)acrylate; a mono(meth)acrylamide compound having one (meth)acrylamide bond in one molecule such as (meth)acrylamide, 2-hydroxyethyl (meth)acrylamide, 2-acrylamido-2-methylpropanesulfonic acid, and a sulfonate thereof; and a betaine compound such as N-methacryloyloxyethyl-N,N-dimethylammonium-N-methylcarboxy betaine, 2-(methacryloyloxy)ethyl 2-(trimethylammonio)ethyl phosphate, N-(3-sulfopropyl)-N-(methacryloxyethyl)-N,N-dimethylammonium betaine, or N-(4-sulfobutyl)-N-(methacryloylaminopropyl)-N,N-diammonium betaine.

Particularly, it is preferable that the composition of the present invention contains a monofunctional (meth)acryl compound containing a hydroxyl group or a monofunctional (meth)acrylamide compound containing a hydroxyl group.

Specific examples of the monofunctional (meth)acryl compound containing a hydroxyl group include 2-hydroxyethyl (meth)acrylate, 2-hydroxypropyl (meth)acrylate, 2-hydroxybutyl (meth)acrylate, 4-hydroxybutyl (meth)acrylate, and glycerin mono(meth)acrylate.

Examples of the monofunctional (meth)acrylamide compound containing a hydroxyl group include 2-hydroxyethyl (meth)acrylamide.

Other monomers may be used alone or in combination of two or more kinds thereof.

In a case where the composition of the present invention contains other monomers, the content of other monomers is not particularly limited, but is preferably in a range of 1% to 80% by mass and more preferably in a range of 10% to 50% by mass with respect to the total solid content.

In the case where the composition of the present invention contains other monomers, the total content of the specific compound and other monomers in the composition of the present invention is not particularly limited, but is preferably in a range of 5.0% to 87.5% by mass and more preferably in a range of 50.0% to 87.0% by mass with respect to the total solid content.

[Initiator]

It is preferable that the composition of the present invention contains an initiator and more preferable that the composition thereof contains a photopolymerization initiator.

Examples of the photopolymerization initiator include an alkyne phenone-based photopolymerization initiator, a methoxy ketone-based photopolymerization initiator, an acylphosphine oxide-based photopolymerization initiator, a hydroxy ketone-based photopolymerization initiator (such as IRGACURE 184; 1,2-α-hydroxyalkylphenone), an aminoketone-based photopolymerization initiator (such as 2-methyl-1-[4-(methylthio)phenyl]-2-morpholino-propan-1-one (IRGACURE (registered trademark) 907)), an oxime-based photopolymerization initiator, and an oxyphenyl acetic acid ester-based photopolymerization initiator (IRGACURE (registered trademark) 754).

Examples of other initiators include an azo-based polymerization initiator (such as V-50), a persulfate-based polymerization initiator, a peroxide-based polymerization initiator, a redox-based polymerization initiator.

Further, the initiator may be a water-soluble initiator or an oil-soluble initiator, but a water-soluble initiator is preferable. The initiator may be used alone or in combination of two or more kinds thereof.

The content of the initiator in the composition of the present invention is not particularly limited, but is preferably 0.5% by mass or greater and less than 10% by mass and more preferably in a range of 1.0% to 5.0% by mass with respect to the total solid content.

(Preferred Aspects)

It is preferable that the composition of the present invention contains a compound represented by Formula (IV). This compound functions as a so-called photopolymerization initiator.

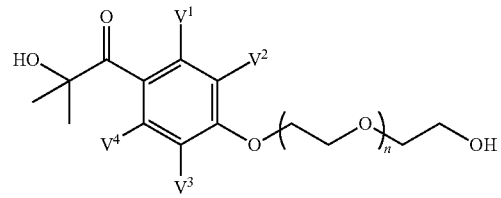

Formula (IV)

In Formula (IV), $V^1$, $V^2$, $V^3$, and $V^4$ each independently represent a hydrogen atom or a substituent.

The kind of substituent is not particularly limited, and examples thereof include a halogen atom, an alkyl group, an alkoxy group, a hydroxy group, an alkylthio group, a mercapto group, an acyl group, and an amino group.

As the halogen atom, a fluorine atom, a chlorine atom, a bromine atom, or an iodine atom is preferable; a chlorine atom or a bromine atom is more preferable; and a chlorine atom is particularly preferable.

The number of carbon atoms contained in the alkyl group is not particularly limited, but is preferably in a range of 1 to 6 and more preferably in a range of 1 to 3. The alkyl group may be a linear alkyl group or a branched alkyl group. Further, the alkyl group may have an alicyclic structure. Specific examples of the alkyl group include a methyl group, an ethyl group, an n-propyl group, an isopropyl group, an n-butyl group, an s-butyl group, a t-butyl group, an n-pentyl group, an n-hexyl group, and a cyclohexyl group. Among these, a methyl group, an ethyl group, an n-propyl group, and an isopropyl group are preferable.

The number of carbon atoms contained in the alkoxy group is not particularly limited, but is preferably in a range of 1 to 6 and more preferably in a range of 1 to 3. The alkoxy group may be a linear alkoxy group or a branched alkoxy group. Further, the alkoxy group may have an alicyclic structure. Specific examples of the alkoxy group include a methoxy group, an ethoxy group, an n-propyloxy group, an isopropyloxy group, an n-butoxy group, an s-butoxy group, a t-butoxy group, an n-pentyloxy group, an n-hexyloxy group, and a cyclohexyloxy group. Among these, a methoxy group, an ethoxy group, an n-propyloxy group, and an isopropyloxy group are preferable.

The number of carbon atoms contained in the alkylthio group is not particularly limited, but is preferably in a range of 1 to 6 and more preferably in a range of 1 to 4. The alkylthio group may be a linear alkylthio group or a branched alkylthio group. Further, the alkylthio group may have an alicyclic structure. Specific examples of the alkylthio group include a methylthio group, an ethylthio group, an n-propylthio group, an isopropylthio group, an n-butylthio group, an s-butylthio group, a t-butylthio group, an n-pentylthio group, an n-hexylthio group, and a cyclohexylthio group. Among these, a methylthio group, an ethylthio group, an n-propylthio group, and an isopropylthio group are preferable.

The number of carbon atoms contained in the acyl group is not particularly limited, but is preferably in a range of 1 to 6 and more preferably in a range of 1 to 3. The acyl group may be a linear acyl group or a branched acyl group. Specific examples of the acyl group include a formyl group, an acetyl group, an ethylacyl group, an n-propylacyl group, and an isopropylacyl group. Among these, a formyl group, an acetyl group, and an ethylacyl group are preferable.

Examples of the amino group include a primary amino group ($-NH_2$), a secondary amino group ($-NHR$), and a tertiary amino group ($-NR_2$). Here, R represents a hydrocarbon group (for example, an alkyl group having 1 to 6 carbon atoms). Two R's in a tertiary amino group may be the same as or different from each other. Specific examples of the amino group include a dimethylamino group and a diethylamino group.

In Formula (IV), n represents an integer of 1 to 5. From the viewpoint of excellent effects of the present invention, an integer of 1 to 3 is preferable, an integer of 1 or 2 is more preferable, and 1 is still more preferable.

The compound represented by Formula (IV) may be used alone or in combination of two or more kinds thereof.

Specific examples of the compound represented by Formula (IV) are listed in Table 1, but the compound represented by Formula (IV) is not limited thereto.

TABLE 1

| | | Formula (IV) | | | |
|---|---|---|---|---|---|
| | n | $V^1$ | $V^2$ | $V^3$ | $V^4$ |
| (IV)-1 | 1 | H | H | H | H |
| (IV)-2 | 2 | H | H | H | H |
| (IV)-3 | 3 | H | H | H | H |
| (IV)-4 | 5 | H | H | H | H |
| (IV)-5 | 1 | $CH_3$ | H | H | H |
| (IV)-6 | 1 | H | $CH_3$ | H | H |
| (IV)-7 | 1 | H | $OCH_3$ | H | H |
| (IV)-8 | 1 | H | Cl | H | H |
| (IV)-9 | 1 | H | Br | H | H |
| (IV)-10 | 1 | H | OH | H | H |
| (IV)-11 | 1 | Cl | Cl | H | H |
| (IV)-12 | 1 | $SCH_3$ | H | H | H |
| (IV)-13 | 2 | Cl | H | Cl | H |
| (IV)-14 | 2 | H | $CH_3$ | H | H |
| (IV)-15 | 2 | H | $N(CH_3)_2$ | Cl | H |
| (IV)-16 | 2 | $CH_3$ | $CH_3$ | H | H |
| (IV)-17 | 3 | H | OH | H | H |
| (IV)-18 | 3 | H | $CH_3$ | H | H |
| (IV)-19 | 5 | H | $COCH_3$ | H | H |
| (IV)-20 | 5 | H | $CH_3$ | H | H |

A compound in a state of a liquid under a temperature condition of 23° C. is exemplified as one preferred aspect of the compound represented by Formula (IV).

The compound represented by Formula (IV) can be synthesized in conformity with a method described in paragraphs 0067 to 0071 and 0112 to 0115 of JP2000-186242A.

The content of the compound represented by Formula (IV) in the composition of the present invention is not particularly limited, but is preferably 0.5% by mass or greater and less than 10% by mass and more preferably in a range of 1.0% to 5.0% by mass with respect to the total solid content.

[Other Components]

The composition of the present invention contains components other than the above-described components. Examples of such components include a solvent other than water, a binder resin, a polyfunctional amine, a polyfunctional thiol, a surfactant, a plasticizer, a surface lubricant, a leveling agent, a softening agent, an antioxidant, an aging inhibitor, a light stabilizer, an ultraviolet absorbent, an inorganic or organic filler, and metal powder.

Examples of the solvent other than water include organic solvents (such as esters ethyl acetate and n-butyl acetate; aromatic hydrocarbons such as toluene and benzene; aliphatic hydrocarbons such as n-hexane and n-heptane; alicyclic hydrocarbons such as cyclohexane and methyl cyclohexane; ketones such as methyl ethyl ketone and methyl isobutyl ketone; and alcohols such as methanol and butanol).

The binder resin is not particularly limited, and examples thereof include an acrylic resin, a styrene-based resin, a vinyl-based resin, a polyolefin-based resin, a polyester-based resin, a polyurethane-based resin, a polyamide-based resin, a polycarbonate-based resin, a polydiene-based resin, an epoxy-based resin, a silicone-based resin, a cellulose-based polymer, and a chitosan-based polymer.

[Method of Preparing Curable Composition]

A method of preparing a curable composition is not particularly limited, and a known method can be employed. For example, the curable composition can be prepared by mixing the above-described components and stirring the mixture using known means. Among examples of the method, a method of mixing a specific compound, other monomers, an initiator, and the like into a π-conjugated conductive polymer aqueous solution is preferable.

[Conductive Coated Film]

The conductive coated film of the present invention is a conductive coated film formed by curing the above-described composition of the present invention.

The thickness of the conductive coated film of the present invention is not particularly limited, but is preferably in a range of 0.1 to 300 μm and more preferably in a range of 1 to 100 μm.

[Method of Producing Conductive Coated Film]

The method of producing the conductive coated film of the present invention is not particularly limited, and a method of coating a base material with the above-described composition of the present invention and curing the composition by heating or irradiating the base material with light (ultraviolet rays, visible light rays, X-rays, or the like) is exemplified.

The base material is not particularly limited, and various plastic base materials can be used.

As the plastic base materials, resin film base materials obtained by using polyethylene terephthalate, polybutylene terephthalate, polyethylene naphthalene, polyethylene, polypropylene, cellophane, diacetyl cellulose, triacetyl cellulose, acetyl cellulose butyrate, polyvinyl chloride, polyvinylidene chloride, polyvinyl alcohol, an ethylene-vinyl acetate copolymer, polystyrene, polycarbonate, polymethylpentene, polysulfone, polyether ether ketone, polyethersulfone, polyetherimide, polyimide, a fluorine resin, nylon, an acrylic resin, polyamide, cycloolefin, and nylon can be used. Among these, from the viewpoint of improving the mechanical strength, it is preferable to use a film formed of polyethylene terephthalate or polyethylene naphthalate.

As the base material, a base material formed of only plastic may be used, and a plastic base material which includes a primer layer on the surface thereof may be used for the purpose of improving the adhesiveness to the conductive coated film.

Further, for the purpose of further improving the adhesiveness to the conductive coated film, the base material may be subjected to a surface treatment such as a surface roughening treatment, a corona discharge treatment, a chromic acid treatment, a flame treatment, a hot air treatment, an ozone treatment, an ultraviolet irradiation treatment, or a surface oxidation treatment according to a sand blast method or a solvent treatment method.

Examples of the method of coating the base material with the curable composition include extrusion coating methods performed by roll coating, kiss roll coating, gravure coating, reverse coating, roll brush coating, spray coating, dip roll coating, bar coating, knife coating, air knife coating, curtain coating, rip coating, and die coating.

The method of heating the base material is not particularly limited, and the base material can be heated using a blast dryer, an oven, an infrared dryer, or a heating drum.

The temperature of heating the base material is not particularly limited, but is preferably in a range of 30° C. to 150° C. and more preferably in a range of 40° C. to 120° C.

The time of heating the base material is not particularly limited, but is preferably in a range of 1 to 20 minutes in a case of drying the base material in a coating device and preferably in a range of room temperature to 50° C., for example, in a case of drying the base material in the winding form behind a coating device.

Examples of the method of irradiating the base material with light include methods of performing irradiation using a low-pressure mercury lamp, a medium-pressure mercury lamp, a high-pressure mercury lamp, a metal halide lamp, Deep-UV light, a xenon lamp, a chemical lamp, and a carbon arc lamp.

The energy of irradiating the base material with light is not particularly limited, but is preferably in a range of 0.1 to 10 $J/cm^2$.

[Use]

Since the conductive coated film of the present invention has excellent toughness, the conductive coated film is useful as a material of a display (particularly, a flexible display) or an electronic element. Further, the conductive coated film of the present invention can also be used as an antistatic coated film and, specifically, the conductive coated film can be used as a polarizing plate protective film for a display or the like.

EXAMPLES

Hereinafter, the present invention will be described in more detail with reference to examples, but the present invention is not limited thereto.

<Preparation of π-Conjugated Conductive Polymer Aqueous Solution>

185 g (1 mol) of sodium styrene sulfonate was dissolved in 1,000 mL of ion exchange water, the solution was stirred at 80° C., 1.14 g (0.005 mol) of an ammonium persulfate (ammonium peroxodisulfate) oxidant solution obtained by being dissolved in 10 ml of water in advance was added dropwise to the solution for 20 minutes, and then the obtained solution was stirred for 12 hours.

1,000 ml of sulfuric acid diluted to 10% by mass was added to the solution obtained in the above-described manner, approximately 1,000 ml of the solution was removed therefrom using an ultrafiltration method, 2,000 ml of ion exchange water was added thereto, and approximately 2,000 ml of the solution was removed therefrom using an ultrafiltration method. This ultrafiltration operation was repeatedly performed three times. In addition, water in the obtained solution was removed under reduced pressure, thereby obtaining a colorless solid content (polystyrene sulfonic acid).

Next, the solid content was mixed into a solution obtained by dissolving 14.2 g (0.1 mol) of ethylene dioxythiophene and 18.5 g (0.15 mol) of polystyrene sulfonic acid (polystyrene sulfonic acid obtained earlier) in 2,000 ml of ion exchange water.

The temperature of this mixed solution was maintained to 20° C., 29.64 g (0.13 mol) of ammonium persulfate dissolved in 200 ml of ion exchange water was slowly added to an oxidation catalyst solution containing 8.0 g (0.02 mol) of ferric sulfate while stirring the solution, and then the resulting solution was stirred for 5 hours to cause a reaction.

2,000 ml of ion exchange water was added to the obtained reaction solution, and approximately 2,000 ml of the solution was removed therefrom using an ultrafiltration method. This operation was repeatedly performed three times.

Subsequently, 2,000 ml of ion exchange water was added to the obtained solution, and approximately 2,000 ml of the solution was removed therefrom using an ultrafiltration method, thereby obtaining approximately 1.5% by mass of blue polystyrene sulfonic acid-doped poly(ethylenedioxythiophene) aqueous solution.

<Preparation of Curable Composition>

A curable composition was prepared by mixing the components listed in Table 2 at proportions (parts by mass) listed in the same table. Further, the content (% by mass) of each component (solid content) in the composition with respect to the total solid content is listed in Table 3.

<Preparation of Coated Film>

As described below, coated films (conductive coated films) of Examples 1 to 14 and coated films of Comparative Examples 1 and 2 were prepared.

An easily adhesive PET film (manufactured by TOYOBO CO., LTD., COSMOSHINE A4100) was coated with the obtained curable composition using a bar coater and exposed to UV light at an energy density of 0.5 J/cm$^2$, thereby preparing a coated film (10 µm) (curing before aging at a low temperature).

Further, the obtained curable composition was stored under a temperature condition of −20° C. for 3 weeks, and then a coated film was prepared in the same manner as described above (curing after aging at a low temperature).

<Evaluation>

(Stability of Composition)

The uniformity of the obtained curable composition was visually confirmed. The results are listed in Table 2 (before aging at a low temperature).

Further, the obtained curable composition was stored under a temperature condition of −20° C. for 3 weeks, and then the uniformity thereof was visually confirmed. The results are listed in Table 2 (after aging at a low temperature).

Here, "one layer" indicates a uniform one layer and "two layer separation" indicates separation into two layers.

(Folding Test)

Each of the obtained coated films (curing before aging at a low temperature and curing after aging at a low temperature) was cut into a size of 1 cm×20 cm and bent at an angle of 90° by holding both ends, and the evaluation was performed based on the following evaluation standard. From the viewpoint of the toughness of the coated film, A or B is preferable and A is more preferable.

A: Peeling of the coated film from the easily adhesive PET film was not found even in a case where the coated film was bent 1,000 times.

B: Peeling of the coated film from the easily adhesive PET film was slightly found in a case where the coated film was bent 1,000 times (peeling of the coated film from the easily adhesive PET film was not found in a case where the coated film was bent 100 times).

C: Peeling of the coated film from the easily adhesive PET film was found in a case where the coated film was bent 100 times.

Further, the comprehensive evaluation is as follows.

A: Both cases of curing before aging at a low temperature and curing after aging at a low temperature are evaluated as A.

B: Both cases of curing before aging at a low temperature and curing after aging at a low temperature are evaluated as B or one of both cases is evaluated as A and the other case is evaluated as B.

C: At least one case of curing before aging at a low temperature and curing after aging at a low temperature is evaluated as C.

(Conductivity and Antistatic Property)

The surface resistivity of each of the obtained coated films was measured as follows. As the result, the surface resistivity of the coated films obtained from the composition of the examples was less than $10^{12}$ (Ω/□), and it was confirmed that the conductivity of conductive coated films and the antistatic properties of antistatic coated films were sufficient.

On the contrary, the surface resistivity of the coated films obtained from the composition of Comparative Examples 1 and 2 was $10^{12}$ (Ω/□) or greater, and it was confirmed that the conductivity of conductive coated films and the antistatic properties of antistatic coated films were insufficient.

Method of Measuring Surface Resistivity

The obtained coated films were cut into a size of 10 cm×10 cm and were allowed to stand in an atmosphere of 25° C. at a relative humidity of 40% for 24 hours. Thereafter, the surface resistivity (Ω/□) of the coated films after 1 minute from application of a voltage thereto was measured (temperature: 25° C., relative humidity: 40%, and applied voltage: 100 V) using a surface resistance measuring device (SME-8310, manufactured by TOA Electronics Co., Ltd.).

TABLE 2

| | Polyfunctional (meth)acrylamide compound | | | | | | Monofunctional | Initiator | | |
|---|---|---|---|---|---|---|---|---|---|---|
| | Compound 1 | Compound 2 | Compound 3 | Compound 4 | Compound 5 | Comparative compound | monomer HEMA | Initiator 1 | V-50 | Irg. 754 |
| Example 1 | 97 | | | | | | | 3 | | |
| Example 2 | | 97 | | | | | | 3 | | |
| Example 3 | | | 97 | | | | | 3 | | |
| Example 4 | | | | 97 | | | | 3 | | |
| Example 5 | | | | | 97 | | | 3 | | |
| Example 6 | 50 | | | | | | 47 | 3 | | |
| Example 7 | 10 | | | | | | 87 | 3 | | |
| Example 8 | 5 | | | | | | 92 | 3 | | |
| Example 9 | 99 | | | | | | | 1 | | |
| Example 10 | 99.5 | | | | | | | 0.5 | | |
| Example 11 | 97 | | | | | | | | 3 | |
| Example 12 | 97 | | | | | | | | | 3 |
| Example 13 | 97 | | | | | | | 3 | | |
| Example 14 | 97 | | | | | | | 3 | | |
| Comparative Example 1 | | | | | | 97 | | | | 3 |
| Comparative Example 2 | | | | | | 97 | | 3 | | |

TABLE 2-continued

| | π-conjugated conductive polymer aqueous solution 1 | π-conjugated conductive polymer aqueous solution 2 | π-conjugated conductive polymer aqueous solution 3 | Composition stability Before aging at low temperature | Composition stability After aging at low temperature | Folding test Curing before aging at low temperature | Folding test Curing after aging at low temperature | Comprehensive evaluation |
|---|---|---|---|---|---|---|---|---|
| Example 1 | 900 | | | One layer | One layer | A | A | A |
| Example 2 | 900 | | | One layer | One layer | A | A | A |
| Example 3 | 900 | | | One layer | One layer | A | A | A |
| Example 4 | 900 | | | One layer | One layer | A | A | A |
| Example 5 | 900 | | | One layer | One layer | A | A | A |
| Example 6 | 900 | | | One layer | One layer | A | A | A |
| Example 7 | 900 | | | One layer | One layer | A | A | A |
| Example 8 | 900 | | | One layer | One layer | B | B | B |
| Example 9 | 900 | | | One layer | One layer | A | A | A |
| Example 10 | 900 | | | One layer | One layer | B | B | B |
| Example 11 | 900 | | | One layer | One layer | B | B | B |
| Example 12 | 900 | | | One layer | Slightly two layer separation | A | B | B |
| Example 13 | | 1230 | | One layer | One layer | A | A | A |
| Example 14 | | | 1040 | One layer | One layer | A | A | A |
| Comparative Example 1 | 900 | | | Two layer separation | Two layer separation | C | C | C |
| Comparative Example 2 | 900 | | | Two layer separation | Two layer separation | C | C | C |

TABLE 3

| | Polyfunctional (meth)acrylamide compound Compound 1 | Compound 2 | Compound 3 | Compound 4 | Compound 5 | Comparative compound | Monofunctional monomer HEMA |
|---|---|---|---|---|---|---|---|
| Example 1 | 85.5% | | | | | | |
| Example 2 | | 85.5% | | | | | |
| Example 3 | | | 85.5% | | | | |
| Example 4 | | | | 85.5% | | | |
| Example 5 | | | | | 85.5% | | |
| Example 6 | 44.1% | | | | | | 41.4% |
| Example 7 | 8.8% | | | | | | 76.7% |
| Example 8 | 4.4% | | | | | | 81.1% |
| Example 9 | 87.2% | | | | | | |
| Example 10 | 87.7% | | | | | | |
| Example 11 | 85.5% | | | | | | |
| Example 12 | 85.5% | | | | | | |
| Example 13 | 85.5% | | | | | | |
| Example 14 | 85.5% | | | | | | |
| Comparative Example 1 | | | | | | 85.5% | |
| Comparative Example 2 | | | | | | 85.5% | |

| | Initiator Initiator 1 | Initiator V-50 | Initiator Irg. 754 | π-conjugated conductive polymer aqueous solution 1 | π-conjugated conductive polymer aqueous solution 2 | π-conjugated conductive polymer aqueous solution 3 |
|---|---|---|---|---|---|---|
| Example 1 | 2.6% | | | 11.9% | | |
| Example 2 | 2.6% | | | 11.9% | | |
| Example 3 | 2.6% | | | 11.9% | | |
| Example 4 | 2.6% | | | 11.9% | | |
| Example 5 | 2.6% | | | 11.9% | | |
| Example 6 | 2.6% | | | 11.9% | | |
| Example 7 | 2.6% | | | 11.9% | | |
| Example 8 | 2.6% | | | 11.9% | | |
| Example 9 | 0.9% | | | 11.9% | | |
| Example 10 | 0.4% | | | 11.9% | | |
| Example 11 | | 2.6% | | 11.9% | | |
| Example 12 | | | 2.6% | 11.9% | | |
| Example 13 | 2.6% | | | | 11.9% | |
| Example 14 | 2.6% | | | | | 11.9% |

TABLE 3-continued

| | | |
|---|---|---|
| Comparative Example 1 | | 2.6% | 11.9% |
| Comparative Example 2 | 2.6% | | 11.9% |

In Tables 2 and 3, the details of respective component are as follows.

(Polyfunctional (Meth)Acrylamide Compound)

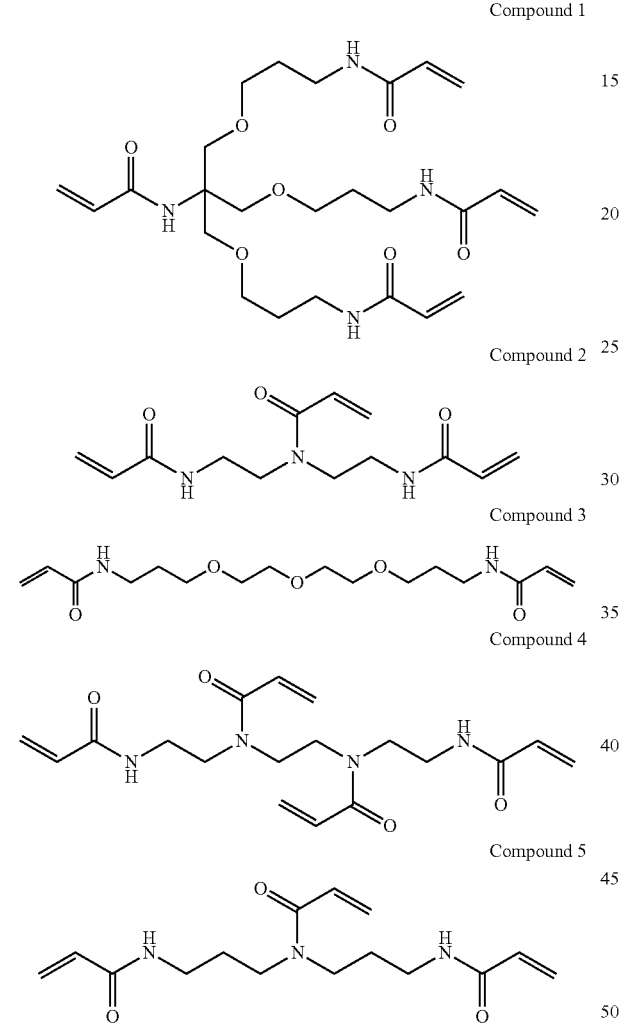

Compound 1

Compound 2

Compound 3

Compound 4

Compound 5

Comparative Compound: Ditrimethylolpropane Tetraacrylamide (Monofunctional Monomer)

HEMA: 2-hydroxyethyl methacrylate (manufactured by Wako Pure Chemical Industries, Ltd.)

(Initiator)

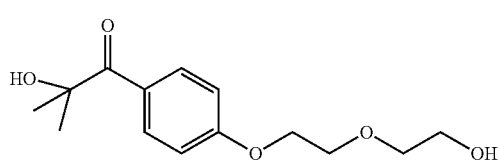

Initiator 1

V-50: V-50 (water-soluble azo-based thermal initiator) (manufactured by Wako Pure Chemical Industries, Ltd.)

Irg. 754: IRGACURE 754 (manufactured by BASF SE)

(π-Conjugated Conductive Polymer Aqueous Solution)
- π-conjugated conductive polymer aqueous solution 1: π-conjugated conductive polymer aqueous solution prepared in the above-described manner
- π-conjugated conductive polymer aqueous solution 2: poly(3,4-ethylenedioxythiophene)/polystyrenesulfonic acid aqueous solution (manufactured by Agfa Company, product name: Orgacon™ ICP 1050, 1.1% by mass of aqueous dispersion)
- π-conjugated conductive polymer aqueous solution 3: poly(3,4-ethylenedioxythiophene)/polystyrenesulfonic acid aqueous solution (manufactured by Sigma-Aldrich Co., LLC., product name: 483095, 1.3% by mass of aqueous dispersion)

As listed in Table 2, all coated films (conductive coated films) obtained from the compositions of Examples 1 to 14 which were obtained by using at least one polyfunctional (meth)acrylamide compound (specific compound) selected from the group consisting of a polyfunctional (meth)acrylamide compound represented by Formula (I) and a polyfunctional (meth)acrylamide compound represented by Formula (II) exhibited excellent toughness. Further, as described above, it was confirmed that the conductivity of conductive coated films and the antistatic properties of antistatic coated films were sufficient.

From the comparison of Examples 1 to 5 to Examples 11 and 12, the coated films of Examples 1 to 5, which contained a compound represented by Formula (IV), exhibited excellent toughness.

From the comparison of Examples 1 to 10, the coated films in Examples 1 to 7 and 9 in which the content of the specific compound was in a range of 5.0% to 87.5% by mass with respect to the total solid content and the content of the compound represented by Formula (IV) was 0.5% by mass or greater and less than 10% by mass with respect to the total solid content exhibited excellent toughness.

Meanwhile, both coated films obtained in Comparative Examples 1 and 2, each of which a specific compound was not used, exhibited insufficient toughness. As described above, it was confirmed that the conductivity of conductive coated films and the antistatic properties of antistatic coated films were insufficient.

What is claimed is:
1. A curable composition comprising:
   at least one polyfunctional (meth)acrylamide compound selected from the group consisting of a polyfunctional (meth)acrylamide compound represented by Formula (I) and a polyfunctional (meth)acrylamide compound represented by Formula (II);
   a π-conjugated conductive polymer;
   water; and
   a compound represented by Formula (IV),
   wherein the content of the polyfunctional (meth)acrylamide compound is in a range of 5.0% to 87.5% by mass with respect to the total solid content, and the content of the compound represented by Formula (IV) is 0.5% by mass or greater and less than 10% by mass with respect to the total solid content,

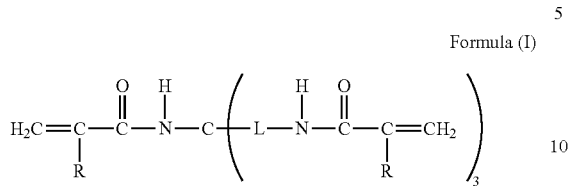

Formula (I)

in Formula (I), R represents a hydrogen atom or a methyl group, and L represents —O—, an alkylene group having 2 to 4 carbon atoms, or a divalent linking group formed by combining these,

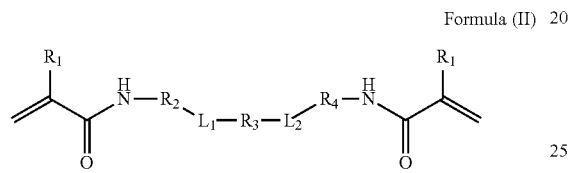

Formula (II)

in Formula (II), $R_1$ represents a hydrogen atom or a methyl group, $R_2$ and $R_4$ each independently represent —O—, an alkylene group having 1 to 4 carbon atoms, or a divalent linking group formed by combining these, $R_3$ represents —O—, an alkylene group having 1 to 4 carbon atoms, a group represented by Formula (III), or a divalent linking group formed by combining these, and $L_1$ and $L_2$ each independently represent a single bond or a group represented by Formula (III),

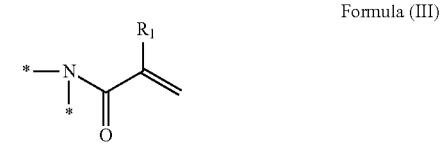

Formula (III)

in Formula (III), $R_1$ represents a hydrogen atom or a methyl group, and the symbol "*" represents a binding site, and

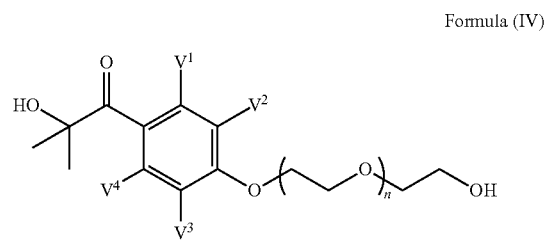

Formula (IV)

in Formula (IV), $V^1$, $V^2$, $V^3$, and $V^4$ each independently represent a hydrogen atom or a substituent, and n represents an integer of 1 to 5.

2. A conductive coated film which is formed by curing the curable composition according to claim 1.

3. An antistatic coated film which is formed by curing the curable composition according to claim 1.

* * * * *